United States Patent
Börner et al.

(10) Patent No.: US 6,685,231 B2
(45) Date of Patent: Feb. 3, 2004

(54) INSULATION PIECE FOR A PIPELINE

(75) Inventors: Gunter Börner, Sinsheim/Eschelbach (DE); Dietmar Eickmeyer, Friedberg (DE); Horst Dörlich, Heidelberg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/056,768

(22) Filed: Jan. 24, 2002

(65) Prior Publication Data
US 2002/0092578 A1 Jul. 18, 2002

Related U.S. Application Data

(63) Continuation of application No. PCT/EP01/05171, filed on May 8, 2001.

(30) Foreign Application Priority Data

May 24, 2000 (DE) ............................................ 100 25 691

(51) Int. Cl.[7] .................................................. F16L 11/12
(52) U.S. Cl. ....................... 285/47; 285/239; 138/108; 174/31 R
(58) Field of Search ................... 285/47, 239; 138/108, 138/109, 96 R; 174/9 F, 31 R, 167

(56) References Cited

U.S. PATENT DOCUMENTS

| | | | | |
|---|---|---|---|---|
| 2,315,623 A | * | 4/1943 | Jacobi | 208/188 |
| 3,259,406 A | * | 7/1966 | Kish | 277/618 |
| 3,843,170 A | * | 10/1974 | Bagnulo | 285/55 |
| 4,046,407 A | * | 9/1977 | Porreco | 285/123.17 |
| 4,098,476 A | * | 7/1978 | Jutte et al. | 248/694 |
| 4,104,497 A | * | 8/1978 | Brealey | 200/305 |
| 4,202,998 A | * | 5/1980 | Cronin | 174/31 R |
| 4,316,053 A | * | 2/1982 | Rieffle | 174/84 S |
| 4,399,169 A | * | 8/1983 | McGowan | 427/284 |
| 4,415,184 A | * | 11/1983 | Stephenson et al. | 285/47 |
| 4,476,361 A | * | 10/1984 | Masaki et al. | 200/305 |
| 4,538,841 A | | 9/1985 | Royston | |
| 4,714,279 A | * | 12/1987 | Custeau | 285/239 |
| 4,771,729 A | | 9/1988 | Planert et al. | |
| 4,879,137 A | | 11/1989 | Behr et al. | |
| 4,930,544 A | * | 6/1990 | Ziu | 138/113 |

FOREIGN PATENT DOCUMENTS

| | | | | |
|---|---|---|---|---|
| DE | 914 085 | | 5/1954 | |
| DE | 1 922 504 | | 9/1965 | |
| DE | 1 975 551 | | 12/1967 | |
| DE | 1 965 422 | | 7/1970 | |
| DE | 1 538 928 | | 12/1970 | |
| DE | 2 101 766 | | 7/1972 | |
| DE | 27 02 925 | | 7/1978 | |
| DE | 31 42 702 A1 | * | 5/1983 | 285/47 |
| DE | 37 16 185 A1 | | 12/1987 | |
| DE | 40 33 086 A1 | | 4/1992 | |

* cited by examiner

*Primary Examiner*—Lynne H. Browne
*Assistant Examiner*—James M. Hewitt
(74) *Attorney, Agent, or Firm*—Laurence A. Greenberg; Werner H. Stemer; Ralph E. Locher

(57) ABSTRACT

An insulation piece for a pipeline conveys electrically conductive liquids from a point that is at a ground potential to a point connected to a high voltage. The liquid is conveyed discontinuously by portion-by-portion transport by the carriage flow of the liquid being interrupted. The insulation piece is periodically free of liquid, corresponding to the interruptions in the carriage flow. The insulation piece is a hollow body, and its unobstructed width is equal to or greater than that of the pipeline. Connecting pieces for connecting to the pipeline are provided on the end faces of the insulation piece, which are closed in places by terminating elements, and which connecting pieces are of the same diameter as the adjacent pipeline. The connecting pieces pass through the terminating elements, rest against them to form a seal, and each have a toroidal-form attachment on the outside at their inner end.

11 Claims, 1 Drawing Sheet

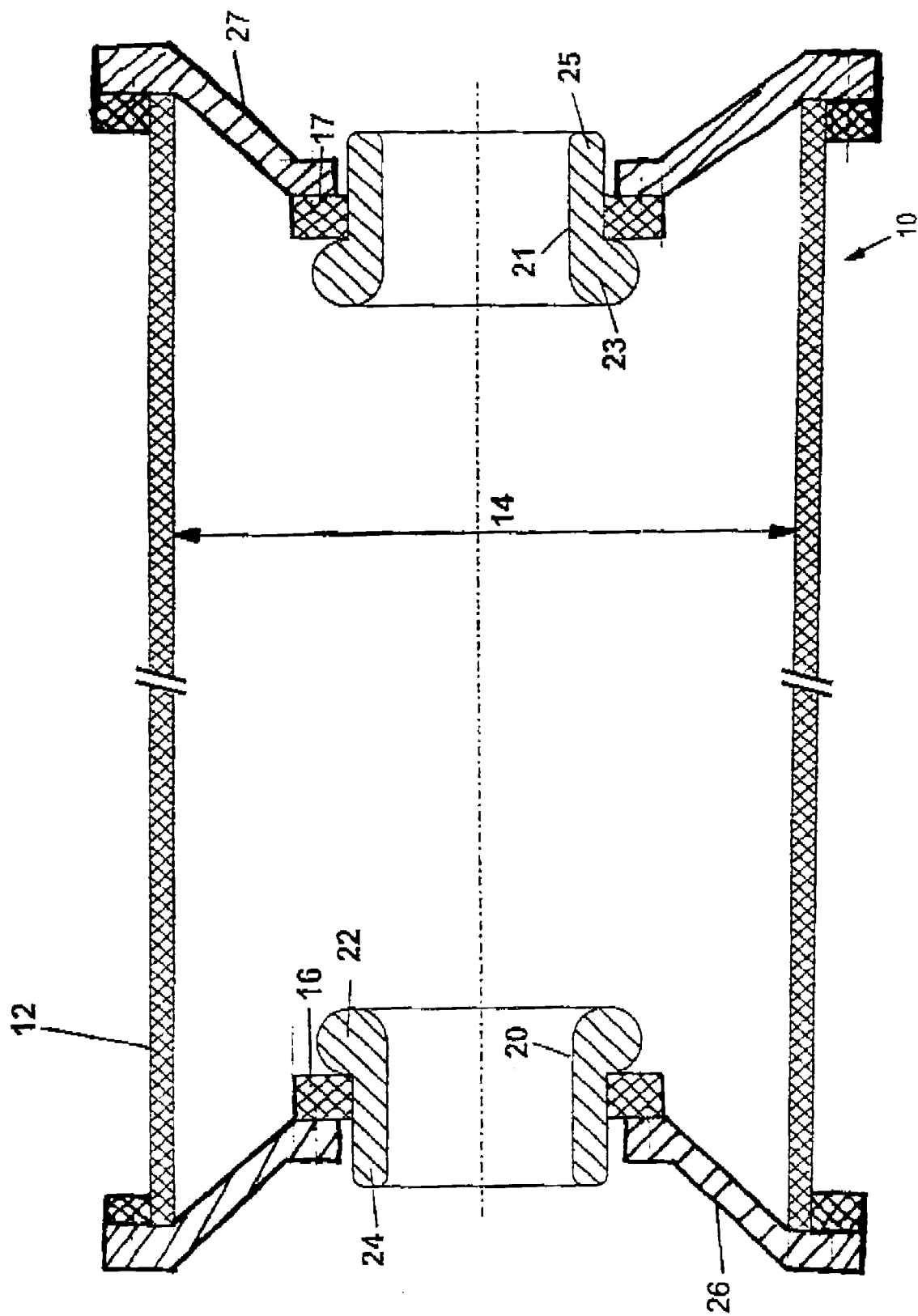

INSULATION PIECE FOR A PIPELINE

CROSS-REFERENCE TO RELATED APPLICATION

This application is a continuation of copending International Application No. PCT/EP01/05171, filed May 8, 2001, which designated the United States.

BACKGROUND OF THE INVENTION

Field of the Invention

The invention relates to an insulation piece for a pipeline for conveying electrically conductive liquids, in particular water-based varnish, from a point that is at a ground potential to a point connected to a high voltage. The liquid is conveyed discontinuously by portion-by-portion transport due to a carriage flow of the liquid being interrupted at times, so that the insulation piece is periodically free, or substantially free, of the liquid, corresponding to the interruptions in the carriage flow. The insulation piece is in the form of a hollow body whose unobstructed width is equal to or greater than that of the pipeline to be connected to. Connecting pieces for connecting the pipeline are provided on the end faces of the insulation piece, which are closed at least in places by terminating elements, and which connecting pieces are of the same diameter as the adjacent pipeline.

In certain applications, liquids are subjected to a high voltage in order to achieve a specific technical effect. For example, this is frequently the case with varnishing or painting processes, in order to improve the efficiency of the coating application method. Specifically, if the varnish or paint is subjected to a high voltage, for example 80 kV, and the work piece to be varnished or painted is at a ground potential, then the electrically charged varnish (paint) particles are not only sprayed on, but are also attracted to the work piece as a consequence of the electrostatically acting force.

One problem in this case is that the varnish or paint normally needs to be at a high-voltage level before the start of the varnishing or painting process. The entire varnish or paint application device, for example the varnishing or painting robot, is thus also at a high voltage. If the varnish or paint is now electrically conductive, as is the case in particular in modern water-based varnishes or paints, a problem arises in that the varnish or paint passes on the electrical charge. The varnish or paint supply containers are thus also at a high voltage, and these are frequently located a distance from the painting or varnishing point, for example in separate buildings or building parts. Such a concept is thus feasible only with major technical complexity and by using special insulation technology.

One alternative to this is formed by what is referred to as insulation paths. These are used as section elements in the feed line. Major components of the insulation path are two pipe pieces, which are at a specific distance from one another and are connected by an insulation pipe piece. In this case, the electrical conduction in the feed line is interrupted in places. In addition, the insulation path is virtually free of electrically the conductive liquid at times. Thus, during this time, the high-voltage area cannot be discharged via the electrically conductive fed medium. At times, the insulation path completely insulates the two pipe ends, which are connected to the feed line, from one another. In these time periods, varnishing or painting can be carried out at a high voltage, with the varnish or paint for the varnishing or painting process then often being taken from an intermediate reservoir, which is on the high-voltage side of the feed line. This is then replenished during the feed phases, in which the insulation path is also filled with the feed medium, and during which no high voltage may be present.

However, this has the disadvantage that the opposite pipe ends in the insulation path have high edge field strengths when the high voltage is applied. This increases the risk of an electrical flashover. Furthermore, the distance between the pipe ends must be configured and constructed to be correspondingly large, so that this results in a correspondingly large amount of space being required here.

SUMMARY OF THE INVENTION

It is accordingly an object of the invention to provide an insulation piece for a pipeline which overcomes the above-mentioned disadvantages of the prior art devices of this general type, in which the risk of inadvertent electrical flashovers is avoided, or at least reduced, and, the insulation piece has a reduced space requirement.

With the foregoing and other objects in view there is provided, in accordance with the invention, an insulation piece for a pipeline conveying an electrically conductive liquid from a point that is at a ground potential to a point connected to a high voltage. The liquid is conveyed discontinuously by portion-by-portion transport due to a flow of the liquid being interrupted at times, so that the insulation piece is one of periodically free and substantially free, of the liquid, corresponding to interruptions in the flow. The insulation piece contains a hollow body having end faces and an unobstructed width equal to or greater than a width of the pipeline to be connected to. Terminating elements are disposed in the hollow body in a region of the end faces of the hollow body and the terminating elements close off at least in places parts of the end faces. Connecting pieces are provided for connecting to the pipeline. The connecting pieces each have a diameter equivalent to a diameter of the pipeline. The connecting pieces each have an external end prepared for connection to the pipeline, an internal end disposed in the hollow body, and a toroidal-shaped attachment formed on an outside area of the internal end. Each of the connecting pieces passes through an associated one of the terminating elements and rests against the associated terminating element to form a seal.

Accordingly, the connecting pieces pass through the terminating elements, resting against them to form a seal, and each have a toroidal-form attachment at their inner end. Furthermore, the external ends are prepared for connection to the pipeline.

The approximately toroidal inner pipe section ends results in that the electrical lines of force are distributed on a surface which is large in comparison to a pipe end, so that no local concentrations of the field strength occur. This advantageously reduces the risk of inadvertent voltage and current flashovers.

Furthermore, the distance between the inner pipe section ends can advantageously be reduced until the critical field strength is reached, and it is necessary to be concerned about a voltage or current flashover.

If the toroidal-form attachment rests against the associated terminating element, as is proposed according to the invention, the advantages just mentioned are achieved in a particularly simple manner. It is easier to fit the connecting piece to the associated terminating element, since the toroidal-form attachment also acts as a stop.

One advantageously simple configuration of the insulation piece overall is for the closed hollow body to be a pipe piece or a pipeline.

The hollow body of the insulation piece according to the invention can be closed particularly easily at its open ends by flanges, covers or similar terminating elements, with the flanges, covers or similar terminating elements being prepared to hold the connecting piece. For example, recesses are then provided in the flanges, covers or similar terminating elements, through which the connecting pieces are passed, and the two elements are firmly connected in the region of the contact surface between the terminating element and the connecting piece.

Polyethylene, plexiglass or other electrically insulating plastics have been found to be particularly suitable for use as the material for the hollow body. Plexiglass provides very good electrical insulation and, owing to its transparency, also offers the capability to observe the processes in the interior of the hollow body.

It is also advantageous, for example, to connect the pipe sections to the flanges, covers or similar terminating elements such that the distance between the inner pipe section ends is adjustable. Therefore, an insulation piece can be flexibly matched to different insulation tasks, and pipeline installation tolerances can be compensated for very easily.

In accordance with an added feature of the invention, the hollow body has a substantially hollow-cylindrical shape.

In accordance with another feature of the invention, the terminating elements are disposed offset inward from the end faces of the hollow body.

In accordance with an additional feature of the invention, a distance between the connecting pieces can be matched to a voltage from which it is to be insulated.

In accordance with a further feature of the invention, the liquid is varnish, water-based varnish, paint, varnish additives, paint additives, curers and other liquids having a viscosity up to that of pasty substances.

In accordance with a concomitant feature of the invention, end covers are disposed on the end faces of the hollow body for closing off open faces of the hollow body. The end covers are formed to hold the connecting pieces, and the end covers are formed as flanges or covers.

Other features which are considered as characteristic for the invention are set forth in the appended claims.

Although the invention is illustrated and described herein as embodied in an insulation piece for a pipeline, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, longitudinal sectional view through a plexiglass insulation piece according to the invention.

DESCRIPTION OF THE PREFERRED EMBODIMENTS

Referring now to the FIGURE of the drawing, there is shown a longitudinal section through an insulation piece 10. The insulation piece 10 has a pipe piece 12, whose entire length is not shown, but which has a specific internal diameter 14. An annular terminating element 16, 17 is fitted to each of the ends of the pipe piece 12, and is fitted into the interior of the pipe piece 12 around approximately one third of the size of the internal diameter 14. The pipe piece 12 and the annular terminating elements 16, 17 together form a hollow body. The hollow body has end covers 26, 27 disposed on said end faces of the hollow body for closing off open faces of the hollow body. The annular terminating elements 16, 17 also each have a recess, into which a respective pipe section or connecting piece 20, 21 is inserted, with the pipe sections 20, 21 each being shaped at one end to form a toroidal pipe section end 22, 23 located within the pipe piece 12. The annular terminating elements 16, 17 and the pipe piece 12 are manufactured from an electrically insulating material, in this case, for example, plexiglass. The pipe sections 20, 21, in contrast, are manufactured from an electrical conductor, in this case steel. The mutually averted ends of the pipe sections 20, 21 are deburred pipe section ends 24, 25, which can be located outside the pipe piece 12 and are intended for connection to a pipeline, which is not shown.

The pipe piece 12, the terminating elements 16, 17 and the pipe sections 20, 21 are firmly connected to one another, and form a sealed enclosure for the liquid flowing therein.

The toroidal pipe ends 22, 23 need not necessarily be composed of a solid material. In this context, toroidal refers essentially to the shape of the surfaces of the pipe section ends that are opposite one another. This in any case prevents the density of the lines of force of the electrical field from increasing excessively between the toroidal pipe ends 22, 23 and, prevents a flashover.

We claim:

1. An insulation piece for a pipeline conveying an electrically conductive liquid from a point which is at a ground potential to a point connected to a high voltage, the liquid being conveyed discontinuously by portion-by-portion transport due to a flow of the liquid being interrupted at times, so that the insulation piece is one of periodically free and substantially free, of the liquid, corresponding to interruptions in the flow, the insulation piece comprising:

a hollow body having end faces and an unobstructed width equal to or greater than a width of the pipeline to be connected to;

terminating elements disposed in said hollow body in a region of said end faces of said hollow body and said terminating elements closing off at least in places, parts of said end faces; and connecting pieces for connecting to the pipeline, said connecting pieces each having a diameter equivalent to a diameter of the pipeline, said connecting pieces each having an external end prepared for connection to the pipeline, an internal end disposed in said hollow body, and a toroidal-shaped attachment formed on an outside area of said internal end, each of said connecting pieces passing through an associated one of said terminating elements and resting against said associated one of said terminating elements to form a seal.

2. The insulation piece according to claim 1, wherein said toroidal-form attachment rests against said associated one of said terminating elements.

3. The insulation piece according to claim 1, wherein hollow body has a substantially hollow-cylindrical shape.

4. The insulation piece according to claim 1, wherein said hollow body is one of a pipe piece and a pipeline.

5. The insulation piece according to claim 1, said terminating elements are formed as one of flanges and covers, and said terminating elements hold said connecting pieces.

6. The insulation piece according to claim 1, wherein said terminating elements are disposed offset inward from said end faces of said hollow body.

7. The insulation piece according to claim 1, wherein said hollow body is formed of a material selected from the group consisting of polyethylene, plexiglass and other electrically insulating plastics.

8. The insulation piece according to claim 1, wherein a distance between said connecting pieces can be matched to a voltage from which it is to be insulated.

9. The insulation piece according to claim 1, wherein the liquid is selected from the group consisting of varnish, paint, varnish additives, paint additives, and curers.

10. The insulation piece according to claim 1, wherein the liquid is a water-based varnish.

11. The insulation piece according to claim 1, including end covers disposed on said end faces of said hollow body for closing off open faces of said hollow body, said end covers formed to hold said connecting pieces, and said end covers formed as one of flanges and covers.

* * * * *